United States Patent
Lee

(10) Patent No.: US 10,383,142 B2
(45) Date of Patent: Aug. 13, 2019

(54) DEVICE AND METHOD OF HANDLING CHANNEL STATUS INFORMATION REPORTS FOR TRANSMISSION TIME INTERVALS

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/867,725

(22) Filed: Jan. 11, 2018

(65) Prior Publication Data

US 2018/0206265 A1 Jul. 19, 2018

Related U.S. Application Data

(60) Provisional application No. 62/445,759, filed on Jan. 13, 2017.

(51) Int. Cl.
*H04W 72/12* (2009.01)
*H04W 72/04* (2009.01)
(Continued)

(52) U.S. Cl.
CPC ........... *H04W 72/1284* (2013.01); *H04L 5/00* (2013.01); *H04L 5/0053* (2013.01);
(Continued)

(58) Field of Classification Search
CPC ......... H04W 72/1284; H04W 72/0413; H04W 72/0446; H04W 72/14; H04L 5/00; H04L 5/0053
See application file for complete search history.

(56) References Cited

U.S. PATENT DOCUMENTS

2013/0039195 A1 2/2013 Weng
2014/0376466 A1 12/2014 Jeong
(Continued)

FOREIGN PATENT DOCUMENTS

EP 2 563 073 A1 2/2013
EP 2 986 075 A1 2/2016
(Continued)

OTHER PUBLICATIONS

Motorola Mobility, CSI aspects of shortened TTI, 3GPP TSG RAN WG1#87, R1-1612743, Nov. 14-19, 2016, Reno, USA, XP051176685.
(Continued)

*Primary Examiner* — Ronald B Abelson
(74) *Attorney, Agent, or Firm* — Winston Hsu

(57) ABSTRACT

A communication device for handling channel status information (CSI) reports for transmission time intervals (TTIs) comprises a storage device for storing instructions and a processing circuit coupled to the storage device. The processing circuit is configured to execute the instructions stored in the storage device. The instructions comprise receiving a downlink (DL) control information (DCI) from a network, wherein the DCI comprises a CSI request indicating a CSI reporting for at least one serving cell of the network; and transmitting a first CSI report for a DL normal TTI (nTTI) of the at least one serving cell and a second CSI report for a DL shortened TTI (sTTI) of the at least one serving cell according to the CSI request to the network.

26 Claims, 4 Drawing Sheets

(51) Int. Cl.
  *H04W 72/14* (2009.01)
  *H04L 5/00* (2006.01)
  *H04W 72/08* (2009.01)

(52) U.S. Cl.
  CPC ... *H04W 72/0413* (2013.01); *H04W 72/0446* (2013.01); *H04W 72/14* (2013.01); *H04L 5/005* (2013.01); *H04L 5/0048* (2013.01); *H04W 72/042* (2013.01); *H04W 72/085* (2013.01); *H04W 72/1205* (2013.01)

(56) References Cited

U.S. PATENT DOCUMENTS

| | | | |
|---|---|---|---|
| 2017/0141833 A1 | 5/2017 | Kim | |
| 2018/0098235 A1* | 4/2018 | Bagheri | H04W 24/08 |
| 2018/0103504 A1* | 4/2018 | Quan | H04W 76/28 |
| 2018/0199322 A1* | 7/2018 | Takeda | H04W 72/04 |

FOREIGN PATENT DOCUMENTS

| | | |
|---|---|---|
| WO | 2014/139174 A1 | 9/2014 |
| WO | 2016/061382 A1 | 4/2016 |
| WO | 2016/086144 A1 | 6/2016 |
| WO | 2016/117981 A1 | 7/2016 |

OTHER PUBLICATIONS

Huawei, HiSilicon, Discussion on CSI feedback for short TTI, 3GPP TSG RAN WG1 Meeting #87, R1-1611166, Reno, USA, Nov. 14-18, 2016, XP051175147.
NTT Docomo, Inc., Views on CSI feedback for shortened TTI with reduced processing time, 3GPP TSG RAN WG1 Meeting #87, R1-1612699, Reno, USA, Nov. 14-18, 2016, pp. 1-7, XP051176642.
Search Report dated May 16, 2018 for EP application No. 18151555.2, filing date: Jan. 15, 2018, pp. 1-11.
Notice of Allowance dated Sep. 19, 2018 for TW application No. 107101399, filing date: Jan. 15, 2018, pp. 1-5.
Search Report dated May 17, 2018 for EP application No. 18151550.3, filing date: Jan. 15, 2018, pp. 1-8.
Office action dated Aug. 14, 2018 for TW application No. 107101380, filing date: Jan. 15, 2018, pp. 1-13.

* cited by examiner

DEVICE AND METHOD OF HANDLING CHANNEL STATUS INFORMATION REPORTS FOR TRANSMISSION TIME INTERVALS

CROSS REFERENCE TO RELATED APPLICATIONS

This application claims the benefit of U.S. Provisional Application No. 62/445,759 filed on Jan. 13, 2017, which is incorporated herein by reference.

BACKGROUND OF THE INVENTION

1. Field of the Invention

The present invention relates to a communication device and a method used in a wireless communication system, and more particularly, to a communication device and a method of handling channel status information reports for transmission time intervals.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1x standard or later versions.

A shortened transmission time interval (sTTI) is proposed to improve transmission efficiency. However, reporting of a channel status information (CSI) report for the sTTI is not defined and is thus unknown. The reporting becomes even more complicated, when the sTTI coexists with a normal TTI (nTTI) (i.e., legacy TTI with a length of 1 ms or 1 subframe). Thus, a mechanism for the reporting of the CSI for the sTTI is an important problem to be solved.

SUMMARY OF THE INVENTION

The present invention therefore provides a method and related communication device for handling channel status information reports for transmission time intervals to solve the abovementioned problem.

A communication device for handling channel status information (CSI) reports for transmission time intervals (TTIs) comprises a storage device for storing instructions and a processing circuit coupled to the storage device. The processing circuit is configured to execute the instructions stored in the storage device. The instructions comprise receiving a downlink (DL) control information (DCI) from a network, wherein the DCI comprises a CSI request indicating a CSI reporting for at least one serving cell of the network; and transmitting a first CSI report for a DL normal TTI (nTTI) of the at least one serving cell and a second CSI report for a DL shortened TTI (sTTI) of the at least one serving cell according to the CSI request to the network.

A communication device for handling channel status information (CSI) reports for transmission time intervals (TTIs) comprises a storage device for storing instructions and a processing circuit coupled to the storage device. The processing circuit is configured to execute the instructions stored in the storage device. The instructions comprise receiving a downlink (DL) control information (DCI) from a network, wherein the DCI comprises a CSI request indicating a CSI reporting for at least one serving cell of the network; and transmitting one of a first CSI report for a DL normal TTI (nTTI) of at least one first serving cell and a second CSI report for a DL shortened TTI (sTTI) of at least one second serving cell according to the CSI request to the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
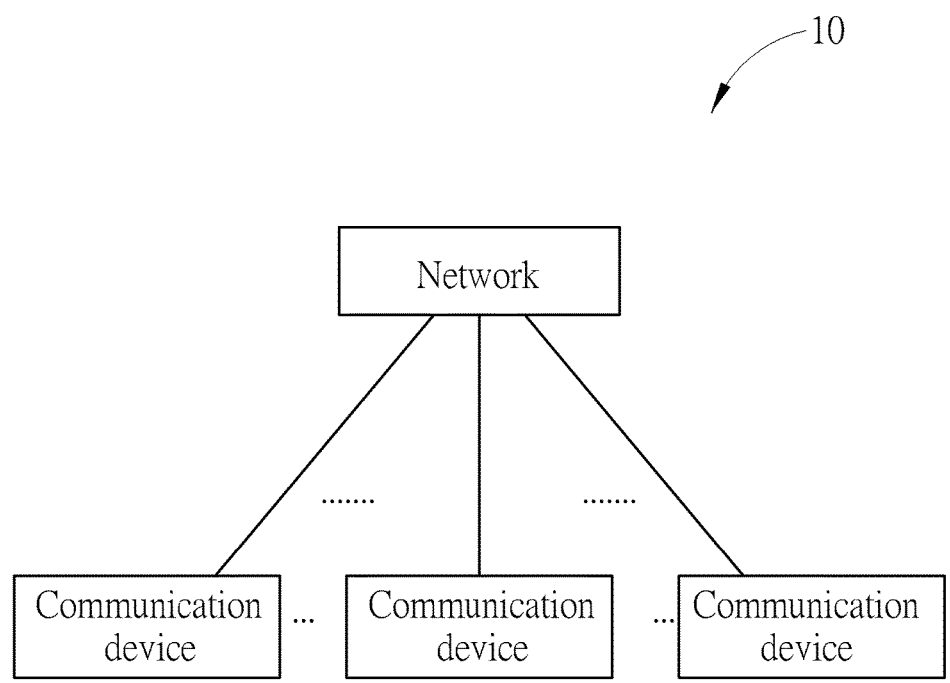
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NR-RAN) including at least one eNB, at least one next generation NB (gNB) and/or at least one fifth generation (5G) base station (BS).

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
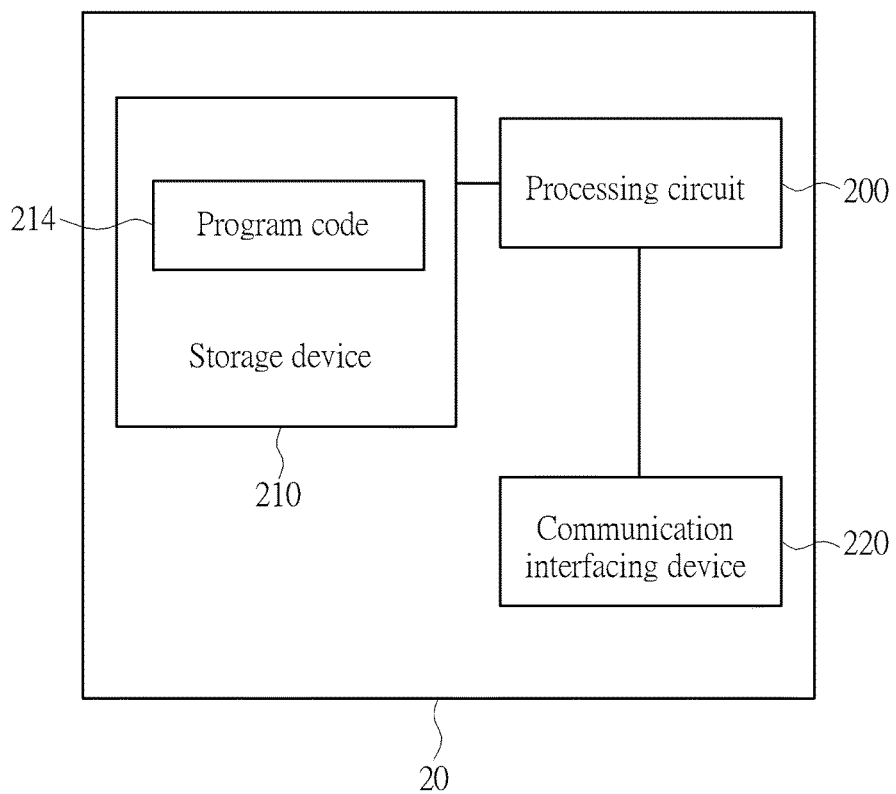
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

Figure 3:
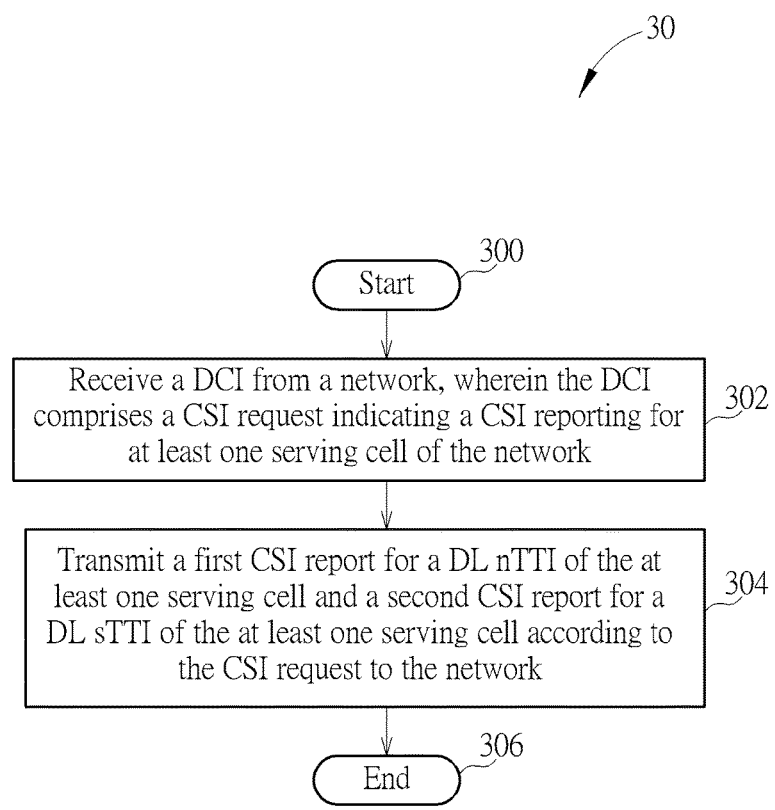
FIG. 3 is a flowchart of a process according to an example of the present invention.

FIG. 3 is a flowchart of a process 30 according to an example of the present invention. The process 30 may be utilized in a communication device shown in FIG. 1, to handle channel status information (CSI) reports for transmission time intervals (TTIs). The process 30 may be compiled into the program code 214 and includes the following steps:

Step 300: Start.

Step 302: Receive a DL control information (DCI) from a network, wherein the DCI comprises a CSI request indicating a CSI reporting for at least one serving cell of the network.

Step 304: Transmit a first CSI report for a DL normal TTI (nTTI) of the at least one serving cell and a second CSI report for a DL shortened TTI (sTTI) of the at least one serving cell according to the CSI request to the network.

Step 306: End.

According to the process 30, the communication device receives a DCI (e.g., UL grant DCI) from a network, wherein the DCI comprises a CSI request (e.g., CSI request field) indicating a CSI reporting for at least one serving cell of the network. Then, the communication device transmit a first CSI report for a DL nTTI of the at least one serving cell and a second CSI report for a DL sTTI of the at least one serving cell according to the CSI request to the network. That is, the communication device transmits the CSI reports for both the DL nTTI and the DL sTTI to the network, after receiving the DCI. In the present example, the CSI request may not explicitly indicate which CSI report is requested. Thus, the reporting of the CSI report for the DL TTIs is solved.

Realization of the process 30 is not limited to the above description. The following examples may be applied for realizing the process 30.

In one example, the communication device transmits the first CSI report and the second CSI report in a UL shared channel (PUSCH) of a UL nTTI scheduled by the DCI. In one example, the communication device transmits the first CSI report and the second CSI report in a shortened PUSCH (sPUSCH) of a UL sTTI scheduled by the DCI. That is, the CSI reports may be transmitted in resource of a UL nTTI or resource of a UL sTTI. In one example, the first CSI report and the second CSI report are aperiodic CSI reports.

In one example, the DCI is a normal DCI (nDCI) (e.g., transmitted in a DL nTTI) for scheduling a PUSCH of a UL nTTI. In one example, the DCI is a shortened DCI (sDCI) (e.g., transmitted in a DL sTTI) for scheduling a sPUSCH of a UL sTTI. That is, the CSI reporting may be indicated (e.g., triggered) by a DCI for scheduling a UL transmission in a UL nTTI or a UL sTTI.

In one example, the communication device transmits the first CSI report by transmitting a differential value of the second CSI report. That is, a CSI report for a DL nTTI may be differentially encoded with a corresponding CSI report for a DL sTTI. Value(s) in the CSI report for the DL nTTI different from that in the CSI report for the DL sTTI may be transmitted.

In one example, the communication device transmits the second CSI report by transmitting a differential value of the first CSI report. That is, a CSI report for a DL sTTI may be differentially encoded with a corresponding CSI report for a DL nTTI. Value(s) in the CSI report for the DL sTTI different from that in the CSI report for the DL nTTI may be transmitted.

In one example, the communication device transmits the first CSI report and the second CSI report, if the CSI request indicates the CSI reporting of the first CSI report and the second CSI report. That is, the CSI reporting of both the CSI reports is explicitly indicated (e.g., triggered) by the CSI request. For example, bits "11" mean that both the CSI reports for the at least one serving cell should be transmitted. For example, bits "10" mean that only the first CSI report for the at least one serving cell should be transmitted. For example, bits "01" mean that only the second CSI report for the at least one serving cell should be transmitted. Please note that the at least one serving cell corresponding to different CSI requests may be the same or different.

In one example, the communication device transmits the first CSI report and the second CSI report according to an order information. Further, the order information may be predetermined, or may be determined according to at least one cell identity (ID) of the at least one serving cell.

Several examples for a first CSI report for a DL nTTI and a second CSI report for a DL sTTI with specific (e.g., predetermined) orders are illustrated as follows.

In one example, the first CSI report may be transmitted first, where three cases of transmissions of the CSI reports may be possible. The first case may be [the first CSI report, the second CSI report]. The second case may be [the first CSI report, the second CSI report represented by a differential value of the first CSI report]. The third case may be [the first CSI report represented by a differential value of the second CSI report, the second CSI report].

In one example, the second CSI report may be transmitted first, where three cases of transmissions of the CSI reports may be possible. The first case may be [the second CSI report, the first CSI report]. The second case may be [the second CSI report, the first CSI report represented by a differential value of the second CSI report]. The third case may be [the second CSI report represented by a differential value of the first CSI report, the first CSI report].

Several examples for a first part of a first CSI report for a DL nTTI of a serving cell A, a first part of a second CSI report for a DL sTTI of the serving cell A and a second part of the first CSI report for the DL nTTI of a serving cell B with specific (e.g., predetermined) orders are illustrated as follows.

In one example, a cell ID has a higher priority. The case may be [the first part of the first CSI report, the first part of the second CSI report, the second part of the first CSI report]. In one example, a format of a CSI report has a higher priority. The case may be [the first part of the first CSI report, the second part of the first CSI report, the first part of the second CSI report].

In one example, the communication device determines (e.g., computes, generates) the first CSI report according to the DL nTTI and the at least one serving cell, and determines (e.g., computes, generates) the second CSI report according to the DL sTTI and the at least one serving cell. In one example, a length of the DL sTTI is not greater than a half length of the DL nTTI. In one example, the at least one serving cell is configured with a sTTI operation (in addition to a legacy nTTI operation). In one example, the at least one serving cell is configured by a higher layer signaling for the CSI request in a nDCI or a sDCI.

In one example, the communication device performs a first channel measurement for the DL nTTI according to a first reference signal (e.g., transmitted by the network), to obtain the first CSI report. In one example, the communication device performs a second channel measurement for the DL sTTI according to a second reference signal (e.g., transmitted by the network), to obtain the second CSI report. In one example, the first reference signal and the second reference signal may be a common reference signal (CRS) and a channel status information reference signal (CSI-RS), respectively. In one example, the first reference signal and the second reference signal may be a CSI-RS and a CRS, respectively. In one example, the first reference signal and the second reference signal may be CRSs. In one example, the first reference signal and the second reference signal may be CSI-RSs. That is, the first reference signal and the second reference signal may the same or different.

In one example, for a communication device, when a serving cell is configured with a sTTI operation, lengths of a DL sTTI and a UL sTTI may be configured by a higher layer signaling. For example, the DL sTTI of the serving cell may be 7 orthogonal frequency division multiplexing (OFDM) symbols (or a slot), and the UL sTTI of the serving cell may be 2 OFDM symbols (or a sub-slot). For example, the DL sTTI of the serving cell may be 2 OFDM symbols (or a sub-slot), and the UL sTTI of the serving cell may be 2 OFDM symbols (or a sub-slot). That is, the lengths of the DL sTTI and the UL sTTI may the same or different.

In one example, for a communication device, when a serving cell is configured with a sTTI operation, a plurality of DL sTTIs (or UL sTTIs) may be comprised in a DL nTTI (or UL nTTI), and a resource of a DL sTTI (or UL sTTI) may be comprised in a single DL nTTI (or UL nTTI).

Figure 4:
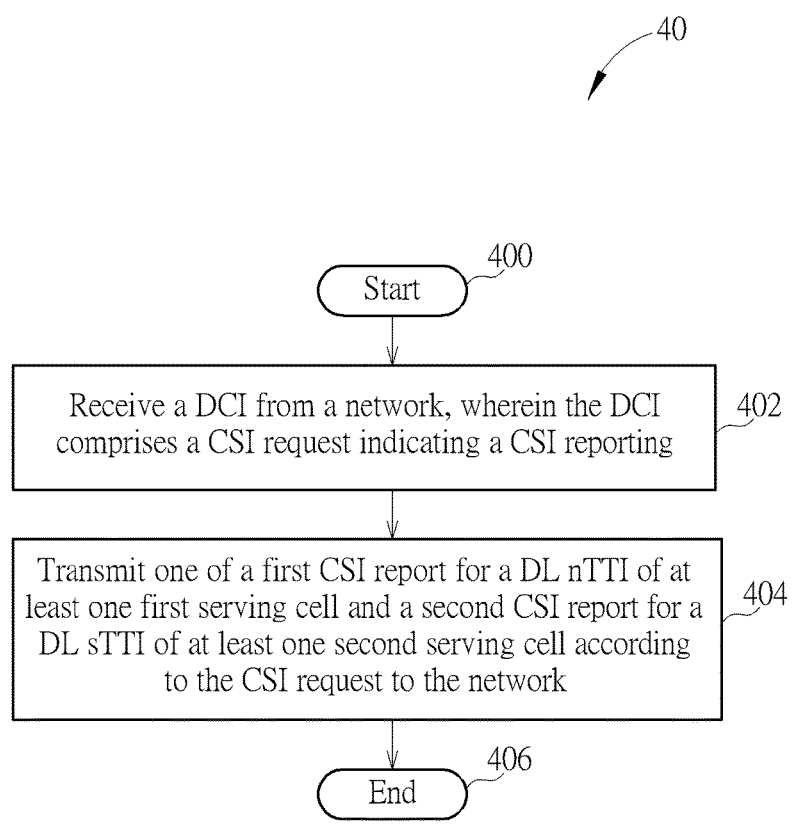
FIG. 4 is a flowchart of a process according to an example of the present invention.

FIG. 4 is a flowchart of a process 40 according to an example of the present invention. The process 40 may be utilized in a communication device shown in FIG. 1, to handle a CSI report for a sTTI. The process 40 may be compiled into the program code 214 and includes the following steps:

Step 400: Start.

Step 402: Receive a DCI from a network, wherein the DCI comprises a CSI request indicating a CSI reporting.

Step 404: Transmit one of a first CSI report for a DL nTTI of at least one first serving cell and a second CSI report for a DL sTTI of at least one second serving cell according to the CSI request to the network.

Step 406: End.

According to the process 40, the communication device receives a DCI (e.g., UL grant DCI) from a network, wherein the DCI comprises a CSI request (e.g., CSI request field) indicating a CSI reporting. Then, the communication device transmits one of a first CSI report for a DL nTTI of at least one first serving cell and at least one second CSI report for a DL sTTI of at least one second serving cell according to the CSI request to the network. That is, the communication device transmits either the first CSI report or the second CSI report to the network, after receiving the DCI. In the present example, the CSI request may not explicitly indicate which CSI report is requested. The at least one first serving cell and the at least one second serving cell may be the same, partly the same or completely different. Thus, the reporting of the CSI reports for the DL TTIs is solved.

Realization of the process 40 is not limited to the above description. The following examples may be applied for realizing the process 40.

In one example, the communication device transmits the one of the first CSI report and the second CSI report in a PUSCH of a UL nTTI scheduled by the DCI. In one example, the communication device transmits the one of the first CSI report and the second CSI report in a sPUSCH of a UL sTTI scheduled by the DCI. That is, the CSI reports may be transmitted in a resource of a UL nTTI or a resource of a UL sTTI. In one example, the one of the first CSI report and the second CSI report is an aperiodic CSI report.

In one example, the DCI is a nDCI (e.g., transmitted in a DL nTTI) for scheduling a PUSCH of a UL nTTI. In one example, the DCI is a sDCI (e.g., transmitted in a DL sTTI)

for scheduling a sPUSCH of a UL sTTI. That is, the CSI reporting may be indicated (e.g., triggered) by a DCI for scheduling a UL transmission in a UL nTTI or a UL sTTI.

In one example, the one of the first CSI report and the second CSI report is the first CSI report. In one example, the one of the first CSI report and the second CSI report is the second CSI report.

In one example, the communication device transmits the one of the first CSI report and the second CSI report, if the CSI request indicates the CSI reporting of the one of the first CSI report and the second CSI report. That is, the CSI reporting of the CSI report(s) is explicitly indicated (e.g., triggered) by the CSI request. For example, bits "01" mean that the first CSI report should be transmitted, and bits "10" mean that the second CSI report should be transmitted.

In one example, the communication device transmits the one of the first CSI report and the second CSI report according to a DCI format. For example, the first CSI report is transmitted if the CSI request is transmitted in a nDCI, and the second CSI report is transmitted if the CSI request is transmitted in a sDCI.

In one example, the communication device determines (e.g., computes, generates) the first CSI report according to the DL nTTI and the at least one first serving cell, or determines (e.g., computes, generates) the second CSI report according to the DL sTTI and the at least one second serving cell. In one example, a length of the DL sTTI is not greater than a half length of the DL nTTI. In one example, the at least one second serving cell is configured with a sTTI operation (in addition to a legacy nTTI operation). In one example, the at least one first serving cell is configured by a higher layer signaling, e.g., for a CSI request transmitted in a nDCI or a sDCI. In one example, the at least one second serving cell is configured by a higher layer signaling, e.g., for a CSI request transmitted in a nDCI or a sDCI.

In one example, the communication device performs a first channel measurement for the DL nTTI according to a first reference signal (e.g., transmitted by the network), to obtain the first CSI report. In one example, the communication device performs a second channel measurement for the DL sTTI according to a second reference signal (e.g., transmitted by the network), to obtain the second CSI report. In one example, the first reference signal and the second reference signal may be a CRS and a CSI-RS, respectively. In one example, the first reference signal and the second reference signal may be a CSI-RS and a CRS, respectively. In one example, the first reference signal and the second reference signal may be CRSs. In one example, the first reference signal and the second reference signal may be CSI-RSs. That is, the first reference signal and the second reference signal may the same or different.

In one example, for a communication device, when a serving cell is configured with a sTTI operation, lengths of a DL sTTI and a UL sTTI may be configured by a higher layer signaling. For example, the DL sTTI of the serving cell may be 7 orthogonal frequency division multiplexing (OFDM) symbols (or a slot), and the UL sTTI of the serving cell may be 2 OFDM symbols (or a sub-slot). For example, the DL sTTI of the serving cell may be 2 OFDM symbols (or a sub-slot), and the UL sTTI of the serving cell may be 2 OFDM symbols (or a sub-slot). That is, the lengths of the DL sTTI and the UL sTTI may the same or different.

In one example, for a communication device, when a serving cell is configured with a sTTI operation, a plurality of DL sTTIs (or UL sTTIs) may be comprised in a DL nTTI (or UL nTTI), and a resource of a DL sTTI (or UL sTTI) may be comprised in a single DL nTTI (or UL nTTI).

The following examples may be applied to the examples of the process 30 and/or 40. A CSI report may include at least one of a rank indicator (RI), a wideband channel quality indicator (CQI), a precoding matrix indicator (PMI), a subband CQI and a subband PMI. A higher layer signaling may be a radio resource control (RRC) signaling. "nTTI", "sTTI", "nDCI" and "sDCI" are terms for simplifying description of the examples, and can be replaced by other terms with similar purpose and/or meaning. Similarly, "sPUSCH" is a term for simplifying description of the examples, and can be replaced by another term with similar purpose and/or meaning.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method for handling CSI reports for TTIs. Solutions for transmitting the CSI reports are proposed. As a result, the reporting of the CSI reports for the TTIs is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A communication device for handling channel status information (CSI) reports for transmission time intervals (TTIs), comprising:

a storage device, for storing instructions of:
  receiving a downlink (DL) control information (DCI) from a network, wherein the DCI comprises a CSI request indicating a CSI reporting for at least one serving cell of the network; and
  transmitting a first CSI report for a DL normal TTI (nTTI) of the at least one serving cell and a second CSI report for a DL shortened TTI (sTTI) of the at least one serving cell according to the CSI request to the network;
  wherein the communication device transmits the first CSI report and the second CSI report according to an order information;
  wherein the order information is predetermined, or is determined according to at least one cell identity (ID) of the at least one serving cell; and
a processing circuit, coupled to the storage device, configured to execute the instructions stored in the storage device.

2. The communication device of claim 1, wherein the communication device transmits the first CSI report and the second CSI report in a physical uplink (UL) shared channel (PUSCH) of a UL nTTI scheduled by the DCI.

3. The communication device of claim 1, wherein the communication device transmits the first CSI report and the second CSI report in a shortened PUSCH (sPUSCH) of a UL sTTI scheduled by the DCI.

4. The communication device of claim 1, wherein the first CSI report and the second CSI report are aperiodic CSI reports.

5. The communication device of claim 1, wherein the DCI is a normal DCI (nDCI) for scheduling a PUSCH of a UL nTTI.

6. The communication device of claim 1, wherein the DCI is a shortened DCI (sDCI) for scheduling a sPUSCH of a UL sTTI.

7. The communication device of claim 1, wherein the communication device transmits the first CSI report and the second CSI report, if the CSI request indicates the CSI reporting of the first CSI report and the second CSI report.

8. The communication device of claim 1, wherein the storage device further stores the instruction of:
  determining the first CSI report according to the DL nTTI and the at least one serving cell; and
  determining the second CSI report according to the DL sTTI and the at least one serving cell.

9. The communication device of claim 1, wherein a length of the DL sTTI is not greater than a half length of the DL nTTI.

10. The communication device of claim 1, wherein the at least one serving cell is configured with a sTTI operation.

11. The communication device of claim 1, wherein the at least one serving cell is configured by a higher layer signaling.

12. The communication device of claim 1, wherein the storage device stores instructions of:
  performing a first channel measurement for the DL nTTI according to a first reference signal, to obtain the first CSI report; and
  performing a second channel measurement for the DL sTTI according to a second reference signal, to obtain the second CSI report.

13. A communication device for handling channel status information (CSI) reports for transmission time intervals (TTIs), comprising:
a storage device, for storing instructions of:
  receiving a downlink (DL) control information (DCI) from a network, wherein the DCI comprises a CSI request indicating a CSI reporting; and
  transmitting one of a first CSI report for a DL normal TTI (nTTI) of at least one first serving cell and a second CSI report for a DL shortened TTI (sTTI) of at least one second serving cell according to the CSI request to the network;
  wherein the communication device transmits the one of the first CSI report and the second CSI report, if the CSI request indicates the CSI reporting of the one of the first CSI report and the second CSI report; and
a processing circuit, coupled to the storage device, configured to execute the instructions stored in the storage device.

14. The communication device of claim 13, wherein the communication device transmits the one of the first CSI report and the second CSI report in a physical uplink (UL) shared channel (PUSCH) of a UL nTTI scheduled by the DCI.

15. The communication device of claim 13, wherein the communication device transmits the one of the first CSI report and the second CSI report in a shortened PUSCH (sPUSCH) of a UL sTTI scheduled by the DCI.

16. The communication device of claim 13, wherein the one of the first CSI report and the second CSI report is an aperiodic CSI report.

17. The communication device of claim 13, wherein the DCI is a normal DCI (nDCI) for scheduling a PUSCH of a UL nTTI.

18. The communication device of claim 13, wherein the DCI is a shortened DCI (sDCI) for scheduling a sPUSCH of a UL sTTI.

19. The communication device of claim 13, wherein the one of the first CSI report and the second CSI report is the first CSI report.

20. The communication device of claim 13, wherein the one of the first CSI report and the second CSI report is the second CSI report.

21. The communication device of claim 13, wherein the storage device further stores the instruction of:
  determining the first CSI report according to the DL nTTI and the at least one first serving cell; or
  determining the second CSI report according to the DL sTTI and the at least one second serving cell.

22. The communication device of claim 13, wherein a length of the DL sTTI is not greater than a half length of the DL nTTI.

23. The communication device of claim 13, wherein the at least one second serving cell is configured with a sTTI operation.

24. The communication device of claim 13, wherein the at least one first serving cell is configured by a higher layer signaling.

25. The communication device of claim 13, wherein the at least one second serving cell is configured by a higher layer signaling.

26. The communication device of claim 13, wherein the storage device stores instructions of:
  performing a first channel measurement for the DL nTTI according to a first reference signal, to obtain the first CSI report; or
  performing a second channel measurement for the DL sTTI according to a second reference signal, to obtain the second CSI report.

* * * * *